US010853816B1

(12) United States Patent
Gaeta et al.

(10) Patent No.: US 10,853,816 B1
(45) Date of Patent: Dec. 1, 2020

(54) SYSTEMS AND METHODS FOR AUTHENTICATION OF AN INDIVIDUAL ON A COMMUNICATIONS DEVICE

(75) Inventors: Michael Joseph Gaeta, San Antonio, TX (US); Bharat Prasad, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 2651 days.

(21) Appl. No.: 12/363,961

(22) Filed: Feb. 2, 2009

(51) Int. Cl.
*G06Q 20/40* (2012.01)

(52) U.S. Cl.
CPC ................... *G06Q 20/409* (2013.01)

(58) Field of Classification Search
USPC .......................................................... 705/75
See application file for complete search history.

(56) References Cited

U.S. PATENT DOCUMENTS

| 5,708,422 | A * | 1/1998 | Blonder ................ G06Q 20/40 340/5.41 |
| 5,917,913 | A * | 6/1999 | Wang .............................. 705/67 |
| 6,084,967 | A * | 7/2000 | Kennedy et al. ............. 380/247 |
| 6,512,919 | B2 * | 1/2003 | Ogasawara ................ 455/422.1 |
| 7,120,607 | B2 * | 10/2006 | Bolle et al. ...................... 705/64 |
| 7,158,776 | B1 * | 1/2007 | Estes ........................ H04L 63/02 380/247 |
| 7,174,323 | B1 * | 2/2007 | Schultz et al. ................... 705/75 |
| 7,600,676 | B1 * | 10/2009 | Rados et al. .................. 235/380 |
| 7,980,462 | B1 * | 7/2011 | Graef et al. .................... 235/379 |
| 8,127,982 | B1 * | 3/2012 | Casey ............... G06Q 20/35785 235/379 |
| 2002/0035543 | A1 * | 3/2002 | Shedd et al. ...................... 705/44 |
| 2002/0065728 | A1 * | 5/2002 | Ogasawara .......... G06Q 20/208 705/23 |
| 2002/0116175 | A1 * | 8/2002 | Stouffer ............ H04M 3/42204 704/9 |
| 2003/0135740 | A1 * | 7/2003 | Talmor .................... G06F 21/32 713/186 |
| 2005/0077349 | A1 * | 4/2005 | Bonalle et al. ............... 235/380 |
| 2005/0096048 | A1 * | 5/2005 | Clare et al. .................... 455/433 |

(Continued)

OTHER PUBLICATIONS

Eric Giguere; "Understanding J2ME Application Models"; Oct. 2002; http://www.oracle.com/technetwork/systems/index-156300.html (Year: 2002).*

(Continued)

Primary Examiner — Zeshan Qayyum
Assistant Examiner — Yingying Zhou
(74) Attorney, Agent, or Firm — Kane Kessler, P.C.; Barry E. Negrin (57) ABSTRACT

A system for authenticating a user may comprise at least one subsystem that contacts a device associated with the user, at least one subsystem that receives a device identification key from the device, at least one subsystem that receives a signal comprising a voice sample from the device, at least one subsystem that compares a voice pattern of the voice sample to that of a previously recorded voice sample of the user, and at least one subsystem that compares the received device identification key to a previously stored device identification key associated with the device associated with the user.

7 Claims, 7 Drawing Sheets

(56) References Cited

U.S. PATENT DOCUMENTS

| | | | |
|---|---|---|---|
| 2005/0096906 A1* | 5/2005 | Barzilay | G06Q 30/06 704/249 |
| 2005/0102244 A1* | 5/2005 | Dickinson et al. | 705/74 |
| 2006/0006226 A1* | 1/2006 | Fitzgerald et al. | 235/380 |
| 2006/0131390 A1* | 6/2006 | Kim | G06Q 20/24 235/380 |
| 2006/0156385 A1* | 7/2006 | Chiviendacz et al. | 726/2 |
| 2006/0206709 A1* | 9/2006 | Labrou et al. | 713/167 |
| 2006/0218006 A1* | 9/2006 | Malik | G06Q 20/04 705/40 |
| 2006/0286969 A1* | 12/2006 | Talmor | G06F 21/32 455/415 |
| 2007/0011099 A1* | 1/2007 | Sheehan | 705/65 |
| 2007/0022301 A1 | 1/2007 | Nicholson et al. | |
| 2007/0055517 A1 | 3/2007 | Spector | |
| 2007/0185718 A1* | 8/2007 | Di Mambro | G06F 21/32 704/273 |
| 2007/0244830 A1* | 10/2007 | Hilderman | G06Q 20/20 705/67 |
| 2008/0016005 A1* | 1/2008 | Owen et al. | 705/73 |
| 2008/0113791 A1* | 5/2008 | Williams et al. | 463/29 |
| 2008/0185429 A1 | 8/2008 | Saville | |
| 2008/0207203 A1* | 8/2008 | Arthur | G06Q 20/322 455/435.1 |
| 2008/0318550 A1* | 12/2008 | DeAtley | 455/411 |
| 2009/0070271 A1* | 3/2009 | Sarkissian et al. | 705/75 |
| 2009/0106148 A1* | 4/2009 | Prada | 705/41 |
| 2009/0112765 A1* | 4/2009 | Skowronek | G06Q 20/32 705/44 |
| 2009/0152343 A1* | 6/2009 | Carter | G06Q 10/0633 235/379 |
| 2009/0172402 A1* | 7/2009 | Tran | 713/170 |
| 2009/0288012 A1* | 11/2009 | Hertel et al. | 715/738 |
| 2010/0179813 A1* | 7/2010 | Summerfield | G10L 17/14 704/246 |
| 2010/0180009 A1* | 7/2010 | Callahan | 709/217 |

OTHER PUBLICATIONS

"TAP—Transaction&Access Platform—Unified Multi-Factor Strong Authentication System for Direct Channels", Sentry Com Ltd., 2 pages.

"Zehu Technologies Products Overview", www.zehu.com/authenticator.asp, Nov. 13, 2008, pp. 1-3.

* cited by examiner

SYSTEMS AND METHODS FOR AUTHENTICATION OF AN INDIVIDUAL ON A COMMUNICATIONS DEVICE

BACKGROUND

Currently, a variety of techniques exist for authentication of a remote user attempting to conduct a transaction, gain access to a network, receive information, or otherwise make use of services provided by a services provider. Such techniques such as requiring the user to provide a user name and password, personal information, or verifying a user's biometric (fingerprint, voice, retinal data) are often used. However, these techniques can be defeated if the user's password or biometric data is somehow captured by another intending to use the data in a fraudulent manner. For example, if the user's password or biometric data is captured by another, then this data may be sent remotely from the other person's device to fraudulently perform the authentication.

In this regard, there is a need for systems and methods that overcome the shortcomings described above and others.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, systems and methods for authentication of an individual on a communications device are provided. For several embodiments, a system for authenticating a user may comprise at least one subsystem that contacts a device associated with the user, at least one subsystem that receives a device identification key from the device, at least one subsystem that receives a signal comprising a voice sample from the device, at least one subsystem that compares a voice pattern of the voice sample to that of a previously recorded voice sample of the user, and at least one subsystem that compares the received device identification key to a previously stored device identification key associated with the device associated with the user.

Other features and embodiments are described below.

BRIEF DESCRIPTION OF THE DRAWINGS

Systems methods for authentication of an individual on a communications device are further described with reference to the accompanying drawings in which.

DETAILED DESCRIPTION

Certain specific details are set forth in the following description and figures to provide a thorough understanding of various embodiments. Certain well-known details often associated with computing and software technology are not set forth in the following disclosure to avoid unnecessarily obscuring the various embodiments. Further, those of ordinary skill in the relevant art will understand that they can practice other embodiments without one or more of the details described below. Finally, while various methods are described with reference to steps and sequences in the following disclosure, the description as such is for providing a clear implementation of various embodiments, and the steps and sequences of steps should not be taken as required to practice the embodiments.

Figure 1:
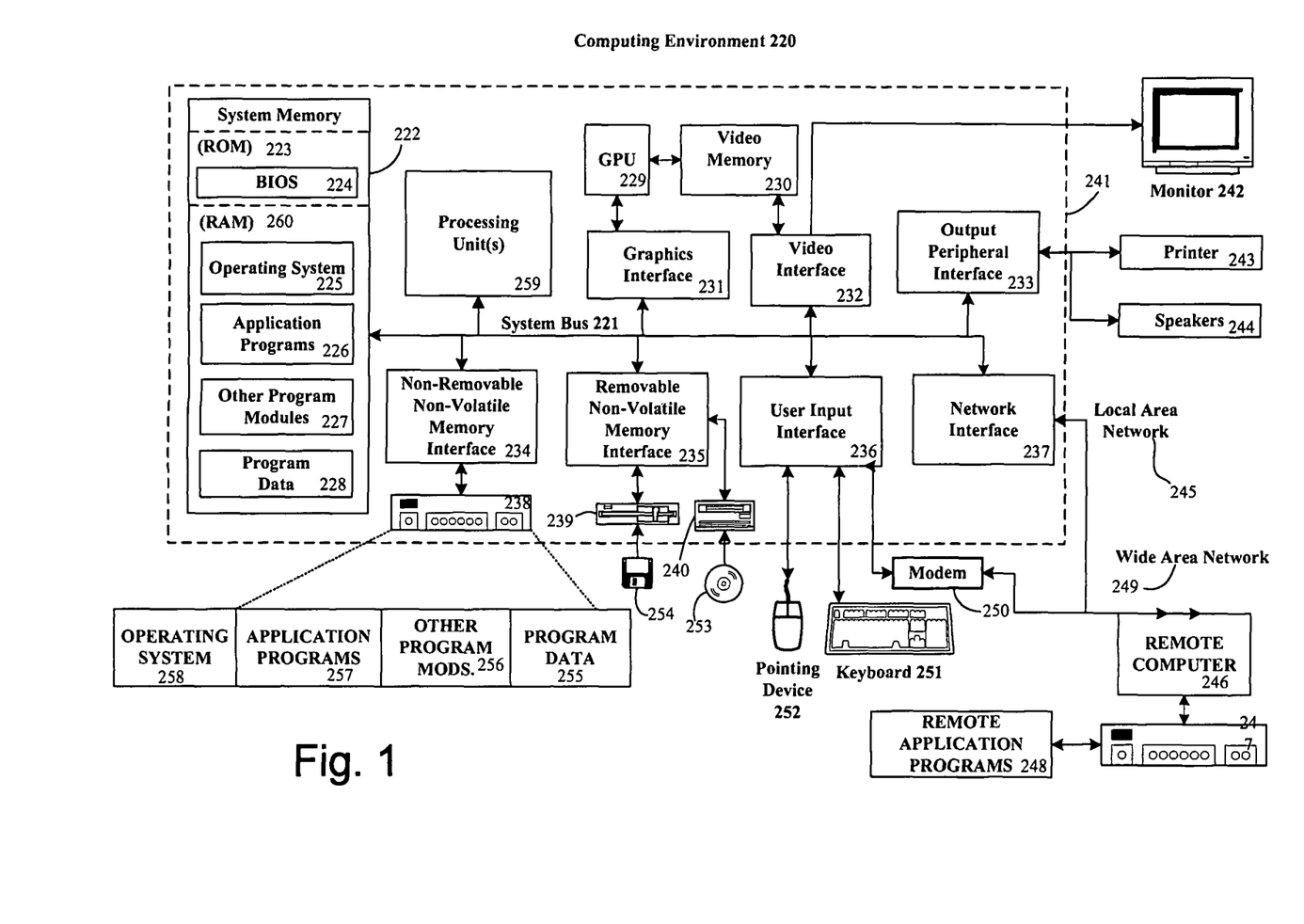
FIG. 1 is a block diagram representing an exemplary computing environment suitable for use in conjunction with implementing systems and methods for authentication of an individual on a communications device.

Referring next to FIG. 1, shown is a block diagram representing an exemplary computing environment suitable for use in conjunction with implementing the processes described below. For example, the computer-executable instructions that carry out the processes and methods for authentication of an individual on a communications device may reside and/or be executed in such a computing environment as shown in FIG. 1. The computing environment 220 is only one example of a suitable computing environment and is not intended to suggest any limitation as to the scope of use or functionality of the embodiments. Neither should the computing environment 220 be interpreted as having any dependency or requirement relating to any one or combination of components illustrated in the exemplary computing environment 220. For example a computer game console or mobile device may also include those items such as those described below for use in conjunction with implementing the processes described below.

Aspects of the embodiments are operational with numerous other general purpose or special purpose computing environments or configurations. Examples of well known computing systems, environments, and/or configurations that may be suitable for use with the embodiments include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the embodiments may be implemented in the general context of computer-executable instructions, such as program modules, being executed by a computer. Generally, program modules include routines, programs, objects, components, data structures, etc. that perform particular tasks or implement particular abstract data types. Aspects of the embodiments may also be practiced in distributed computing environments where tasks are performed by remote processing devices that are linked through a communications network. In a distributed computing environment, program modules may be located in both local and remote computer storage media including memory storage devices.

An exemplary system for implementing aspects of the embodiments includes a general purpose computing device in the form of a computer 241. Components of computer 241 may include, but are not limited to, a processing unit 259, a system memory 222, a graphics interface 231, a graphics processing unit (GPU) 229, video memory 230, and a system bus 221 that couples various system components including the system memory 222 to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and include both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, random access memory (RAM), read-only memory (ROM), Electrically Erasable Programmable Read-Only Memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared and other wireless media. Combinations of the any of the above should also be included within the scope of computer readable media.

The system memory 222 includes computer storage media in the form of volatile and/or nonvolatile memory such as ROM 223 and RAM 260. A basic input/output system (BIOS) 224, containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1 provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus 221, but may be connected by other interface and bus structures, such as a parallel port, game port or a universal serial bus (USB). A monitor 242 or other type of display device is also connected to the system bus 221 via an interface, such as a video interface 232. In addition to the monitor 242, computer 241 may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device 247. By way of example, and not limitation, FIG. 1 illustrates remote application programs 248 as residing on the remote memory storage device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the embodiments, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the embodiments. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the embodiments, e.g., through the use of an application programming interface (API), reusable controls, or the like. Such programs are preferably implemented in a high level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the embodiments in the context of one or more stand-alone computer systems, the embodiments are not so limited, but rather may be implemented in connection with any computing environment, such as a network or distributed computing environment. Still further, aspects of the embodiments may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Figure 2:
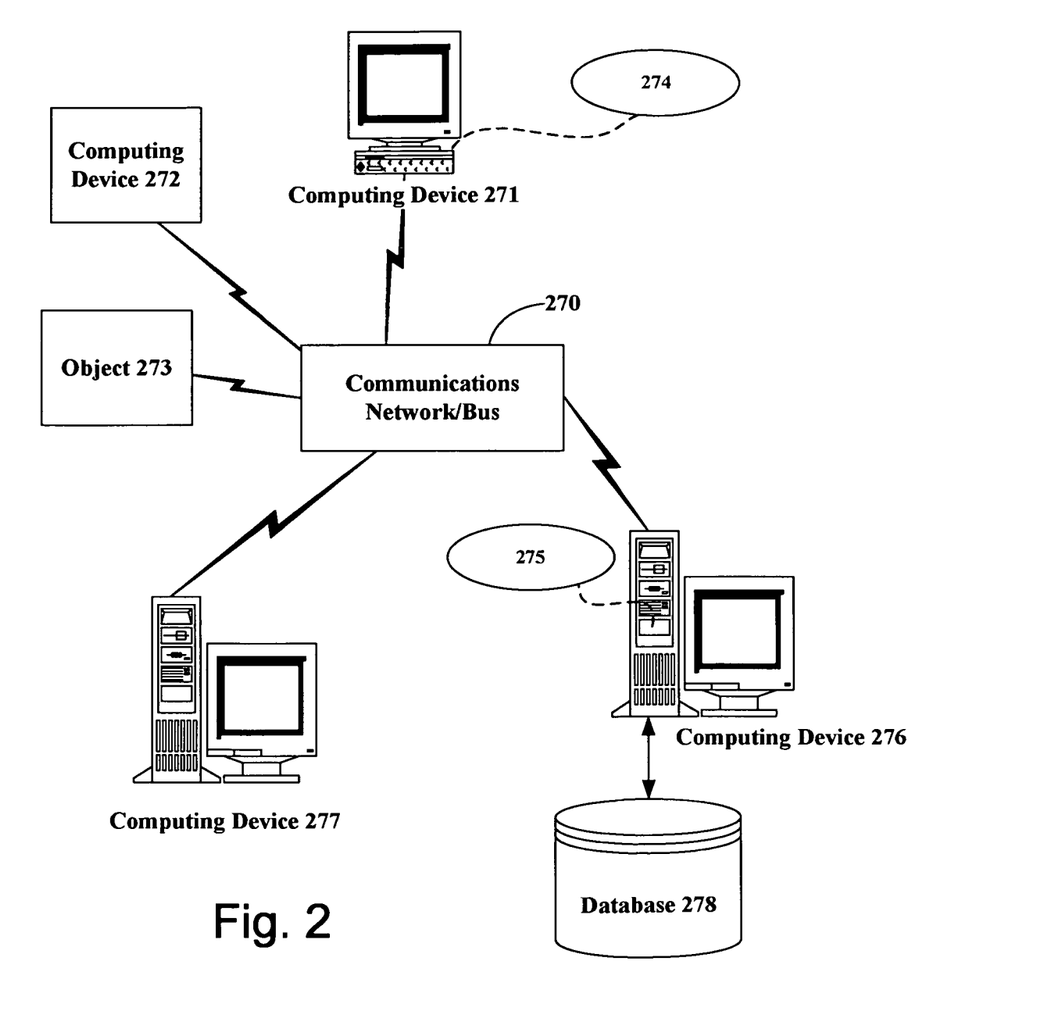
FIG. 2 illustrates an exemplary networked computing environment in which many computerized processes may be implemented to perform authentication of an individual on a communications device.

Referring next to FIG. 2, shown is an exemplary networked computing environment in which many computerized processes may be implemented to perform the processes described below. For example, parallel computing may be part of such a networked environment with various clients on the network of FIG. 2 using and/or implementing processes for authentication of an individual on a communications device. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with aspects of the embodiments, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture. Instead, the embodiments should be construed in breadth and scope in accordance with the appended claims.

Figure 3:
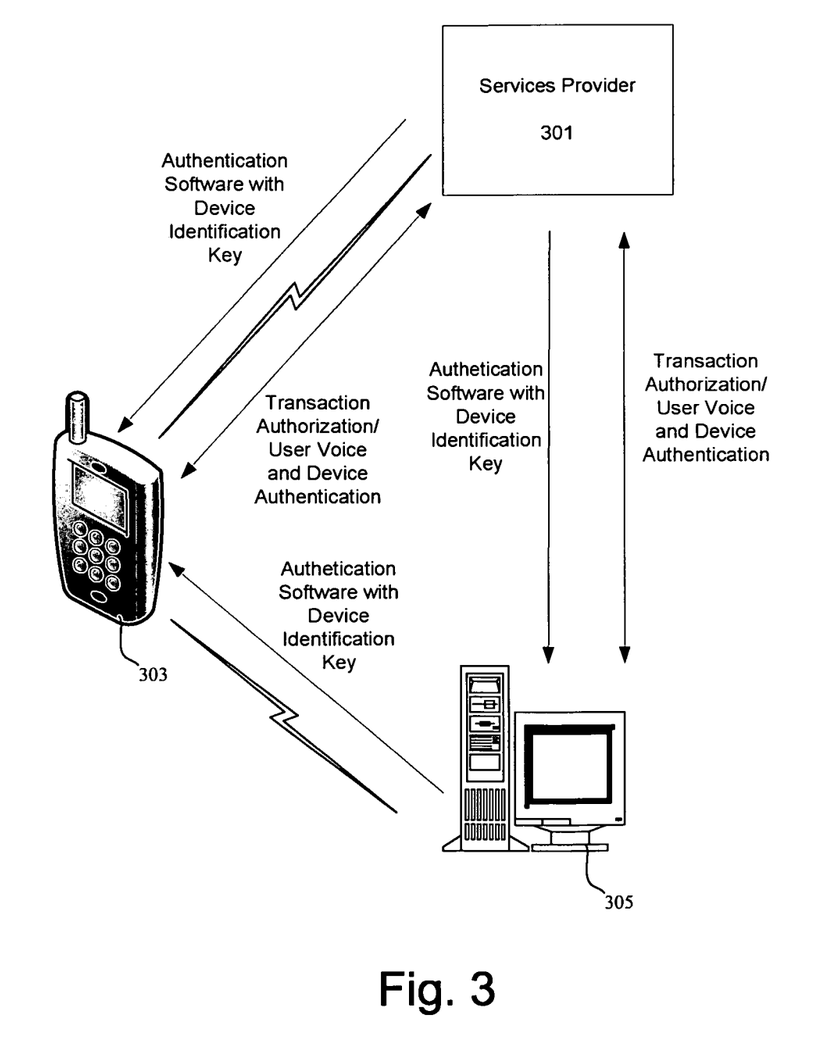
FIG. 3 is a block diagram of an example implementation of a system in which example embodiments and aspects of authentication of a user on a communications device may be implemented.

Referring next to FIG. 3, shown is a block diagram of an example implementation of a system in which example embodiments and aspects of authentication of a user on a communications device may be implemented. Shown are an example user mobile communications device 303, an example services provider 301, and an example user computing device 305. The example user mobile communications device 303, example services provider 301, and example user computing device 305 may be in operable communication with each other as shown in FIG. 3 via one or more networks, such as an intranet, the Internet, a local area network (LAN), a wide area network (WAN), a public switched telephone network (PSTN), a voice over Internet protocol (VoIP) network, a cellular network, satellite network, etc. The services provider 301 may provide services to a user of the communications device 303 and/or computing device 305. The service provided may be any service such as insurance, financial services, banking, consulting, business services, data analysis, information management, legal services, medical services, marketing services, etc. However, the services provider 301 may often need to authenticate a user attempting to communicate or perform a transaction with the services provider 301 before providing such services or having further communications with the user. For example, if the services provider 301 is a credit card company and the user is attempting to perform a credit card transaction, the services provider 301 may need to authenticate that the user attempting to perform the transaction is in fact an authorized user of the credit card.

To enable the authentication of the user, the communication channels as mentioned above between the services provider 301 and mobile communications device 303 and between the services provider 301 and computing device 305 are capable of sending authentication software to be installed on the mobile communications device 303 and/or computing device 305 and a device identification key from the services provider 301 to the mobile communications device 303 and/or the computing device 305. The identification key may be generated by the service provider, for example, to identify either the mobile communications device 303 or the computing device 305, or both for authentication purposes. In the case of the identification key being generated to identify the user mobile communications device 303, the one or more communication channels as mentioned above between the user computing device 305 and the user mobile communications device 303 may be capable of sending the authentication software to be installed on the user mobile communications device 303 and device identification key received from the services provider 301 to the mobile communications device 303. This may be over any of the networks as mentioned including an intelligent short range wireless network such as Bluetooth®, for example.

Also, to enable the authentication of the user, the communication channels as mentioned above between the services provider 301 and mobile communications device 303 and between the services provider 301 and computing device 305 are capable of sending transaction authorization information such as the device identification key and user voice data, for example, from the mobile communications device 303 and/or the computing device 305 to the services provider 301.

Figure 4:
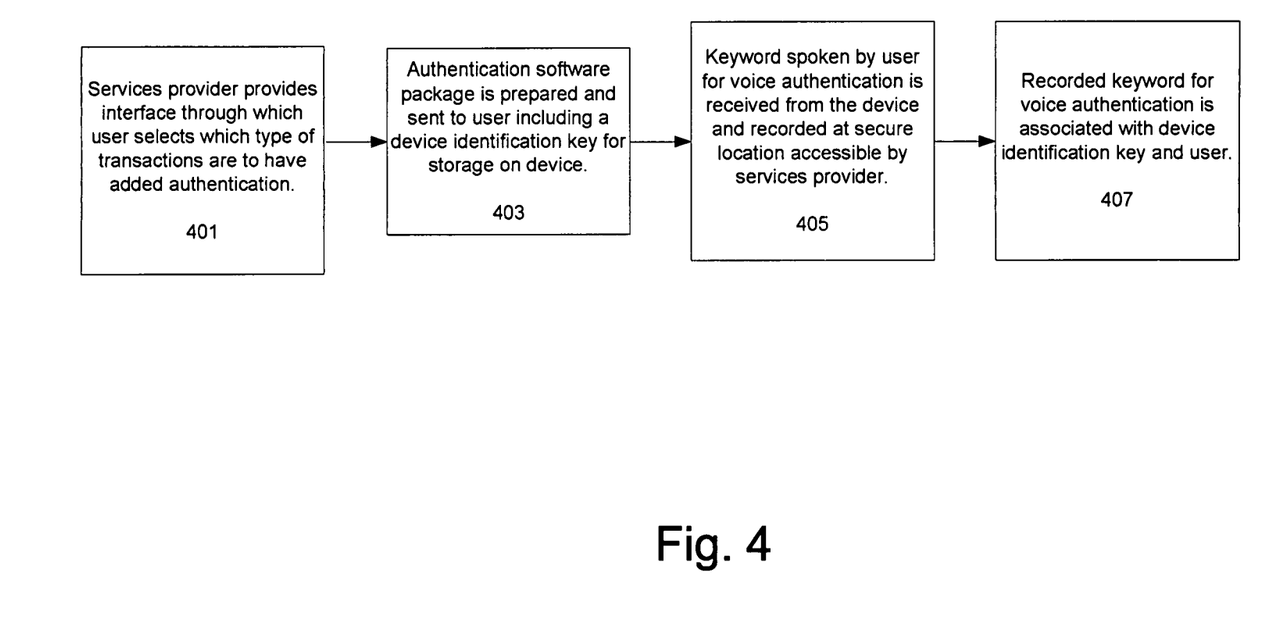
FIG. 4 is a flow chart showing an example process for initializing a user's communication device and authentication information for authentication of the user on the communications device.

Referring next to FIG. 4, shown is a flow chart illustrating an example process for initializing a user's communication device and authentication information for authentication of the user on the communications device. First, the services provider may provide (401) an interface through which a user selects which types of transactions are to have added authentication. The user may be a customer of the services provider, or the services provider's employee, contractor or agent. The user may indicate remotely which type of transactions are to have added authentication via a web interface, over the phone through a live customer service representative or automated system, etc. For example, a user may want all credit card transactions over a certain dollar amount be required to go through added user authentication before they are allowed to complete. Any number of transaction, communication and/or service type options and selections for added authentication may be made available to the user through such an interface. Also, this step may be skipped if it is decided by the services provider or user up front that all transactions or services provided will require such added authentication.

An authentication software package may then be prepared and sent (403) to the user including a device identification key for storage on a mobile communications device or computing device of the user. The authentication software package and identification key may be sent together as an encrypted package for added security and decrypted at the device for which it was intended. The identification key may be generated by the services provider and is intended to be a unique key associated with the particular device on which the software package is to be installed and the user associated with the device. This identification key may be a randomly generated sequence of numbers and/or characters, for example. A different identification key may be generated, for example, for each software package sent (403) to a user dive.

If known, the Electronic Serial Number (ESN) or the International Mobile Equipment Identity (IMEI), or some variation thereof, of the particular device on which the software package is to be installed may be used as the identification key. The ESN is the unique identification number embedded in a wireless phone by the manufacturer. Each time a call is placed, the ESN is automatically transmitted to the base station so the wireless carrier's mobile switching office can check the call's validity. The ESN cannot easily be altered in the field. The ESN differs from the mobile identification number, which is the wireless carrier's identifier for a phone in the network. Each Global System for Mobile Communications (GSM) and Universal Mobile Telecommunications Service (UMTS) mobile phone has a unique IMEI number. IMEI number easily identifies a mobile phone being used on a GSM network. Is the case of using the ESN, IMEI number, or some variation thereof, the identification key may not necessarily need to be sent with the authentication software package. The authentication software, once installed, or as part of the installation process, would identify the Electronic Serial Number (ESN) or the International Mobile Equipment Identity (IMEI) of the device and communicate said number, or variation thereof, back the services provider as the identification key.

The authentication software package may be installed on a user mobile communications device or computing device (hereafter "device") to aid in the communication of authentication information from the device to the services provider. For example the authentication software package may be a client able to communicate with a server at the services provider in order to communicate such information while the user is on a telephone call or other audio or electronic communication session with the services provider. The software may have a storage module capable of identifying and storing the identification key on the device and a communications module capable of sending the identification key to the services provider upon a request by the server at the services provider or any number of other triggers such as a call by the user to the services provider via the device. The authentication software may also have a module to prompt the user to speak a keyword for voice authentication and to send the spoken keyword to the services provider. However, these functions may also be performed at the server of the services provider. "Keyword" as used herein is not limited to a single word and encompasses key phrases as well and any group of words used to identify the voice of the speaker.

The keyword spoken by the user for voice authentication is received (405) from the device and recorded at a secure location accessible by services provider. This secure location may be at the services provider or remotely accessible by the services provider through any number of networks such as those described above. The recorded keyword for voice authentication is then associated (407) with the device identification key associated with the device from which the spoken keyword was received along with the user associated with the identification key. Thus, an example record at the services provider may comprise, but is not limited to: the user information, recorded spoken keyword, identification key, and the network address and/or the telephone number of the device from which the spoken keyword was received.

Figure 5:
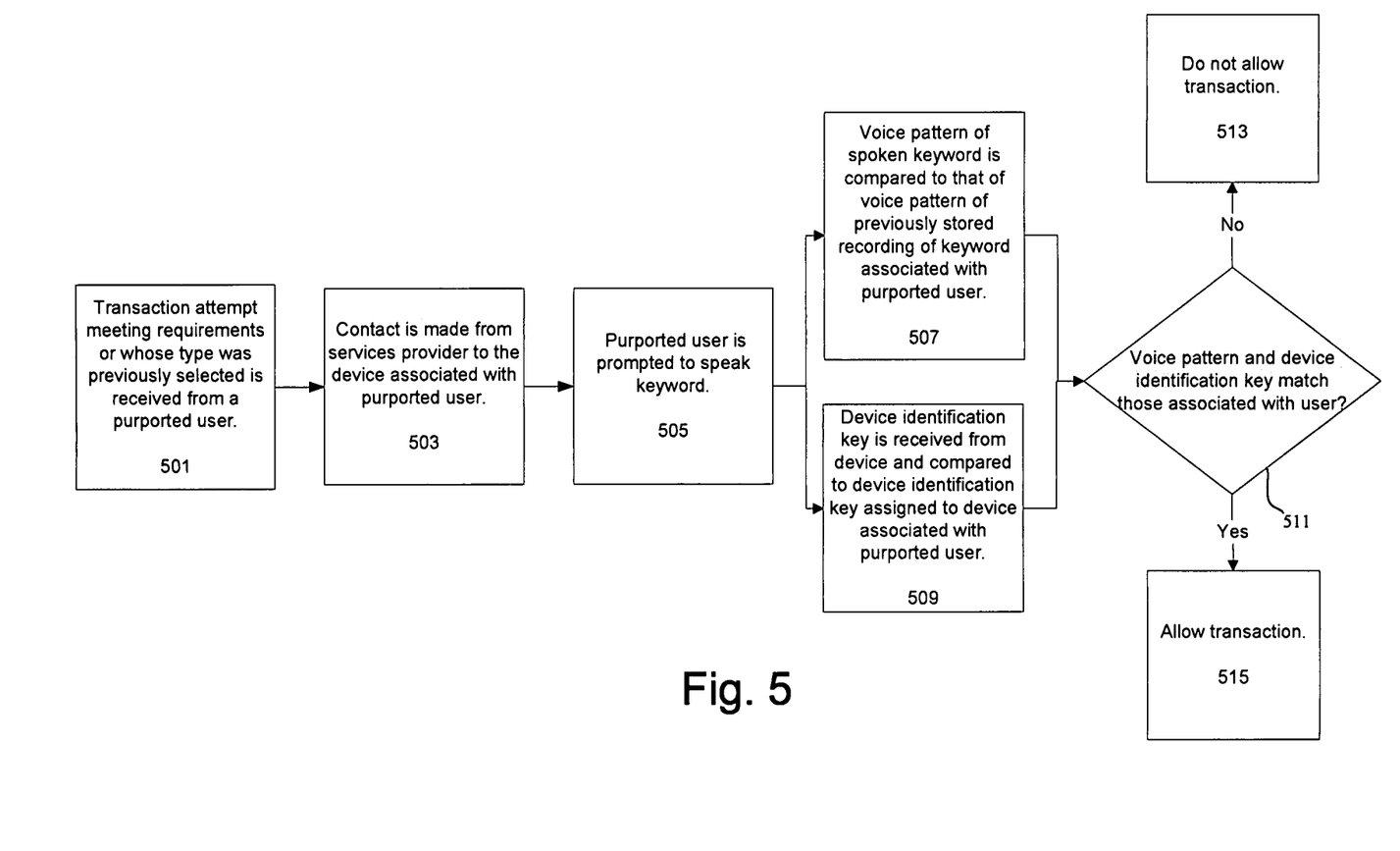
FIG. 5 is a is a flow chart showing an example process for authentication of a user on a communications device using a device identification key and user voice pattern.

Referring next to FIG. 5, shown is a is a flow chart showing an example process for authentication of a user on a communications device using a device identification key and user voice pattern. First, a transaction attempt meeting particular requirements or whose type was previously selected is received (501) from a purported user. For example, this transaction may be a credit card transaction, a log-in attempt by a user on a network of the services provider, an attempt to gain access to information via a phone call to the services provider, etc. Contact is then made (503) from the services provider to the mobile or other device associated with the purported user. For example, the network address or telephone number of the device previously associated with the user name given by the purported user is found and used to make contact to the device. This contact may be via a telephone call to the device associated with the purported user, a live audio chat request to the device of the purported user, text message, email, or any other means of electronic communication.

The user is then prompted (505) at some point to speak the keyword into the device. This may be during a telephone call with the user via the device, audio chat session over a computer network, or any other audio or electronic session between the services provider and the purported user via the device. For example, the actual audio session may begin at the point of the services provider making the contact (such as with the user answering a telephone call or audio chat request from the services provider using the device) or subsequent to the contact (such as with the user receiving a message to initiate an authentication session using the previously installed authentication software on the device).

The voice pattern of the spoken keyword is then compared (507) to that of the voice pattern of the previously stored recording of the keyword associated with the purported user. The device identification key is also received from the device via the authentication software on the device and compared (509) to the device identification key assigned to the device associated with the purported user. It is then determined (511) whether the voice pattern and device identification key match those associated with the user. If the voice pattern and device identification key match those associated with the user, then the transaction is allowed (515). If either the voice pattern or device identification key do not match those associated with the user, or were never received, then the transaction is not allowed (513). The degree or percentage of voice pattern match may be selectable by the services provider or user and need not be a 100% match.

Figure 6:
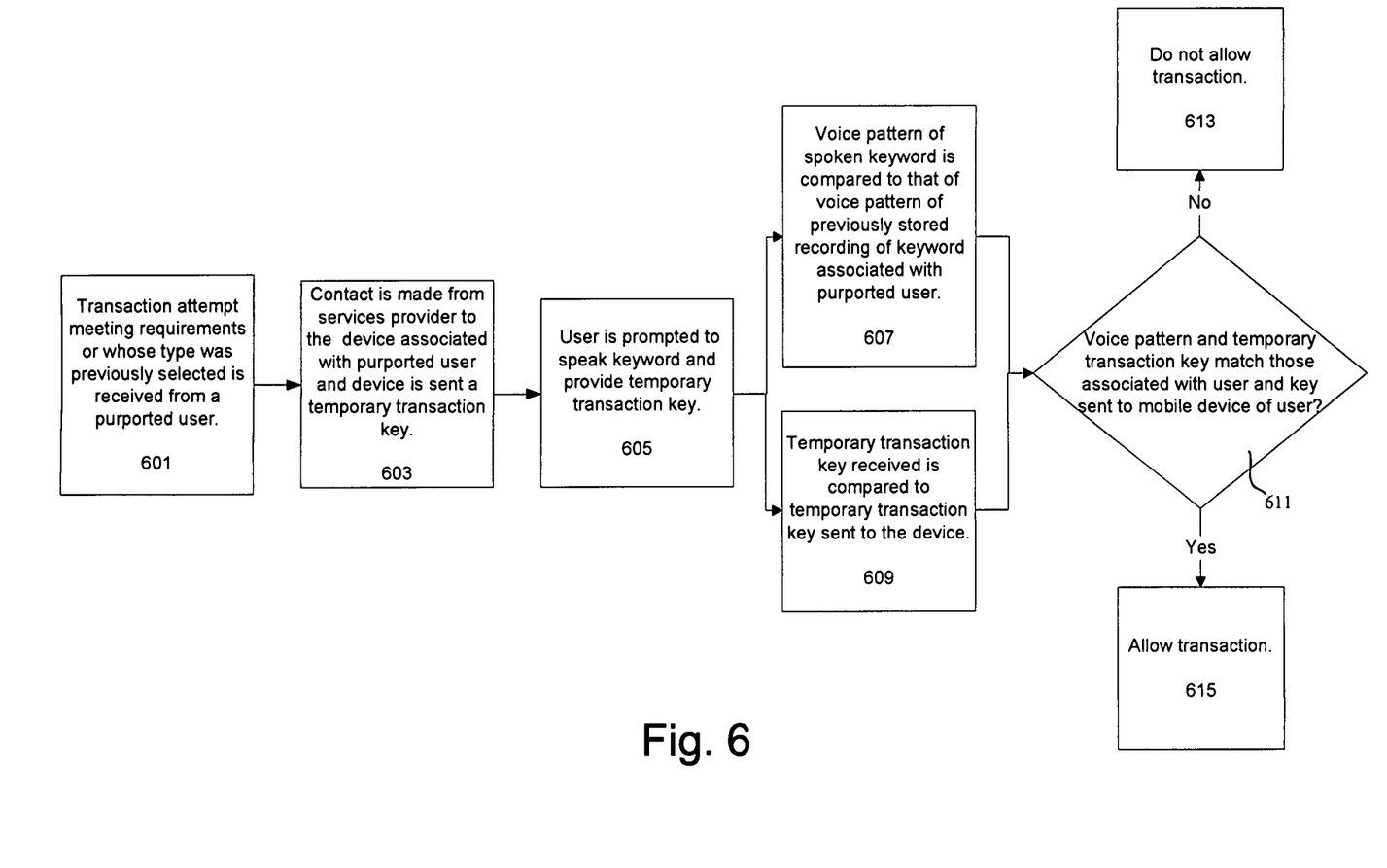
FIG. 6 is a flow chart showing an example process for authentication of a user on a communications device using a temporary transaction key and user voice pattern.

Referring next to FIG. 6, shown is a flow chart showing an example process for authentication of a user on a communications device using a temporary transaction key and user voice pattern. First, a transaction attempt meeting particular requirements or whose type was previously selected is received (601) from a purported user. For example, this transaction may be a credit card transaction, a log-in attempt by a user on a network of the services provider, an attempt to gain access to information via a phone call to the services provider, etc. Contact is then made (603) from the services provider to the mobile or other device associated with the purported user and the device is sent a temporary transaction key. It is important to note that the device to which the temporary transaction key is sent is the device that the services provider has on record as being associated with who the user is purporting to be (i.e., the purported user). Thus, this is not necessarily the same device used to initiate a transaction attempt by the purported user. The temporary transaction key may be any number of numbers and/or characters that uniquely identify the transaction from other transactions at the service provider occurring during the present transaction. The network address or telephone number of the device previously associated with the user name given by the purported user may be found and used to make contact with the device. This contact may be made and the temporary transaction key sent may be via a telephone call to the device associated with the purported user, a live audio chat request or session to or with the device of the purported user, text message, email, any other means of electronic communication, or any combination thereof.

The user is then prompted (605) at some point to speak the keyword into the device and may be prompted to provide the previously sent temporary transaction key. The prompting to speak the keyword may be made during a telephone call with the user via the device, audio chat session over a computer network, or any other audio or electronic session between the services provider and the purported user via the device. For example, the actual audio session may begin at the point of the services provider making the contact (such as with the user answering a telephone call or audio chat request from the services provider using the device) or subsequent to the contact (such as with the user receiving a message to initiate an authentication session with the services provider using the previously installed authentication software on the device). The temporary transaction key may be manually provided by the user (e.g., by speaking it or entering it through a device keypad or device touch screen interface) or provided in an automated fashion from the device via the authentication software on the device as with the device identification key example described above.

The voice pattern of the spoken keyword is then compared (607) to that of the voice pattern of the previously stored recording of the keyword associated with the purported user. The temporary transaction key is also received from the device via the authentication software on the device or through manual input of the user and compared (609) to the temporary transaction key sent to the device associated with the purported user. It is then determined (611) whether the voice pattern and temporary transaction key match the previously recorded voice pattern associated with the purported user and transaction key sent to the device associated with the purported user, respectively. If the voice pattern and temporary transaction key match the previously recorded voice pattern associated with the purported user and transaction key sent to the device associated with the purported user, then the transaction is allowed (615). If the voice pattern does not match the previously recorded voice pattern associated with the purported user, or the temporary transaction key does not match the transaction key sent to the device associated with the purported user, or either the spoken keyword or temporary transaction key were not received, then the transaction is not allowed (613). As with the example described above regarding use of a device identification key, the degree or percentage of voice pattern match may be selectable by the services provider or user and need not be a 100% match.

Figure 7:
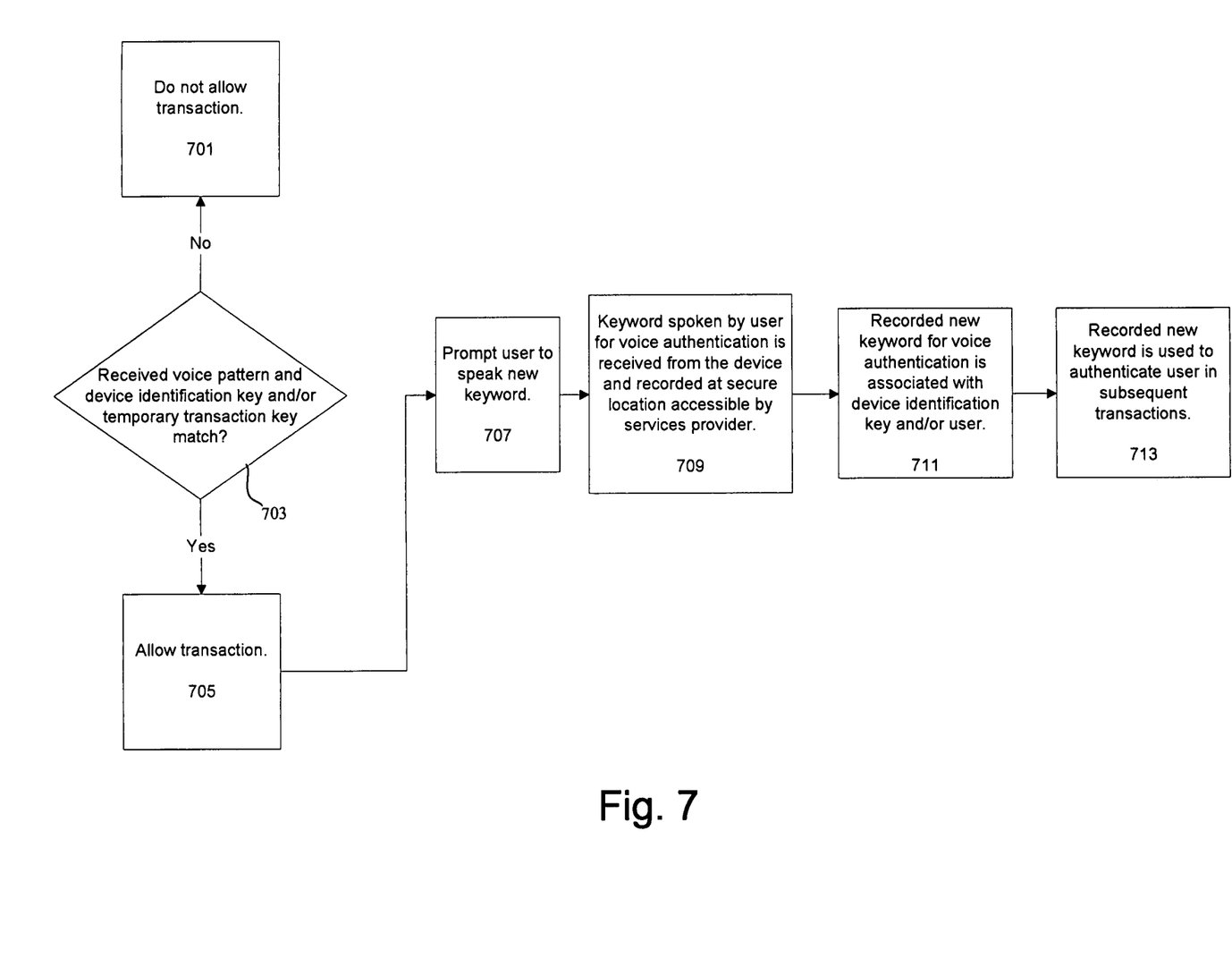
FIG. 7 is a flow chart showing an example process for authentication of a user on a communications device using a temporary voice keyword.

Referring next to FIG. 7, shown is a flow chart illustrating an example process for authentication of a user on a communications device using a temporary voice keyword. First, it is determined (703) whether a received voice pattern and device identification key and/or temporary transaction key match the voice pattern associated with a purported user, the device identification key associated with the device of the purported user, and/or the temporary transaction key previously sent to the device of the purported user, respectively. The received voice pattern, device identification key and/or temporary transaction key may be sent and received in a similar fashion as that described above regarding FIGS. 4 through 6, for example. If the received voice pattern and device identification key and/or temporary transaction key match the voice pattern associated with the purported user and the device identification key associated with the device of the purported user, and/or the temporary transaction key previously sent to the device of the purported user, respectively, then the transaction is allowed (705). If the received voice pattern and device identification key and/or temporary transaction key match do not match as described above, then the transaction is not allowed (701).

If the transaction is allowed, then the user is prompted (707) to speak a new keyword. The prompting to speak the new keyword may be made during a telephone call with the user via the device, audio chat session over a computer network, or any other audio or electronic session between the services provider and the purported user via the device previously associated with the user after it is determined that the current transaction has been allowed (i.e., after the purported user has been authenticated). Again, the device from which the user initiates an attempted current transaction may be different than the device from which the spoken keyword is received. The new keyword spoken by the user is received (709) from the device previously associated with the user and recorded at a secure location accessible by the services provider for future voice authentication purposes.

The recorded new keyword for voice authentication is then associated (711) with the device identification key and/or user in a record accessible by the services provider. This recorded new keyword may then be used to authenticate (713) the user in one or more subsequent transactions. For example, the recorded new keyword may be used as the keyword in such processes as described above regarding FIGS. 4 through 6 for authentication of a user. Also, the process above may be repeated for some or all subsequent transactions as selected by the services provider or user so that some or all subsequent transactions use a new keyword for voice pattern matching purposes, thus adding additional security.

It is noted that the foregoing examples have been provided merely for the purposes of explanation and are in no way to be construed as limiting of the present invention. While the invention has been described with reference to various embodiments, it is understood that the words which have been used herein are words of description and illustration, rather than words of limitations. Further, although embodiments have been described herein with reference to particular means and materials, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A computer-based method for authenticating a user attempting to conduct a transaction comprising the steps of:
   a) sending authentication software to be installed on a first user device;
   b) receiving an indication from a known user identifying i) a type of transaction the known user wants to require voice authentication to process and ii) the first user device to associate with the known user;
   c) receiving a transaction attempt from a second device that is different from the first user device, the transaction attempt being purported to be initiated by the known user;
   d) contacting the first user device associated with the known user based on the indication from the known user after step c);
   e) receiving a device identification key from the first user device;
   f) receiving a signal comprising a voice sample from the first user device;
   g) comparing a voice pattern of the voice sample to that of a previously recorded voice sample of the known user; and
   h) comparing the received device identification key to a previously stored device identification key associated with the first user device associated with the known user.

2. The method of claim 1, wherein the receiving of the transaction attempt triggers step d).

3. The method of claim 2 further comprising the step of allowing the transaction to go through if the voice pattern of the voice sample substantially matches that of the previously recorded voice sample of the known user and the received device identification key matches the previously stored device identification key associated with the first device associated with the known user.

4. The method of claim 3 further comprising the step of preventing the transaction from going through if the voice pattern of the voice sample is not deemed acceptable as a match with previously recorded voice sample of the known user or the received device identification key does not match the previously stored device identification key associated with the first user device associated with the known user.

5. The method of claim 1 wherein the previously recorded voice sample comprises a keyword spoken by the known user and wherein the voice sample of the received signal comprises the same keyword.

6. The method of claim 1 wherein the device identification key comprises one or more of the following: an Electronic Serial Number (ESN) of the first user device associated with the known user, the International Mobile Equipment Identity (IMEI) number of the first user device associated with the known user, a randomly generated sequence of the characters, an encryption key.

7. The method of claim 1 wherein the device identification key and the signal comprising a voice sample from the first user device are received during an audio communications session with the known user via the first user device.

* * * * *